United States Patent
Hyser

(10) Patent No.: US 7,454,787 B2
(45) Date of Patent: Nov. 18, 2008

(54) SECURE DIRECT MEMORY ACCESS THROUGH SYSTEM CONTROLLERS AND SIMILAR HARDWARE DEVICES

(75) Inventor: Chris D. Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 10/756,038

(22) Filed: Jan. 13, 2004

(65) Prior Publication Data

US 2005/0165783 A1   Jul. 28, 2005

(51) Int. Cl.
*G06F 21/00* (2006.01)
(52) U.S. Cl. .................................... 726/16; 713/164
(58) Field of Classification Search ............... 713/164; 726/16

See application file for complete search history.

(56) References Cited

U.S. PATENT DOCUMENTS

| 5,444,855 | A | * | 8/1995 | Thompson | 710/107 |
| 5,659,798 | A | * | 8/1997 | Blumrich et al. | 710/26 |
| 5,802,590 | A | * | 9/1998 | Draves | 711/164 |
| 2003/0188184 | A1 | * | 10/2003 | Strongin et al. | 713/200 |

\* cited by examiner

*Primary Examiner*—Gilberto Barron, Jr.
*Assistant Examiner*—Samson B Lemma

(57) ABSTRACT

A method and system for providing secure, direct access to computer system resources, such as system memory, by a non-trusted processing entity running in an unprivileged state that request access to the resource through a device that directly accesses the resource. The device includes access-right-checking logic and is configured to verify access rights of non-trusted processing entities that attempt to access the resource through the device. By checking access rights, the device ensures that non-trusted processing entities access only those particular portions of the resource authorized for access by the secure kernel.

17 Claims, 18 Drawing Sheets

US 7,454,787 B2

SECURE DIRECT MEMORY ACCESS THROUGH SYSTEM CONTROLLERS AND SIMILAR HARDWARE DEVICES

TECHNICAL FIELD

The present invention relates to computer architecture, operating systems, direct-memory-access-enabled devices, and computer-system security, and, in particular, to a number of methods, and systems employing the methods, for ensuring that direct memory access cannot be maliciously or erroneously employed by external devices to access and/or corrupt otherwise secure system memory resources.

BACKGROUND OF THE INVENTION

Computer security has become an intensely studied and vital field of research in academic, governmental, and commercial computing organizations. While manufacturers and users of computing systems have, for many years, attempted to provide fully secure computer systems with controlled access to stored data, processing resources, and other computational resources within the computer systems, fully secure computer systems currently remain elusive. The need for security has been heightened by public awareness of Internet-related fraud, several high visibility banking-related crimes, and, more recently, the threat of malicious viruses and terrorist-directed cyber assaults.

A fully secure computer needs to be designed on the basis of a comprehensive identification of the myriad different potential vulnerabilities and threats to secure operation of the secure computer system. In general, a fully secure computer system needs to maintain tight security over certain internal resources and isolate and closely monitor external inputs and outputs to insure that external entities, such as external devices, remote computers, and users, cannot access and/or corrupt the internal resources, including portions of system memory within a modern computer system. As computers have evolved to include greater numbers of more complex and capable components, the number of different potential vulnerabilities has greatly increased. Design of fully secure computers is thus a dynamically evolving task that continues to grow in complexity with the evolution of computer hardware. The transfer of data into, and out from, computer systems, for example, involves a set of components that have evolved in ways that increase the potential for unauthorized access of system resources.

FIGS. 1A-D illustrate an initial approach employed within computer systems to transfer data back and forth between internal memory and mass storage devices and communications devices. FIGS. 1A-D employ the same illustration conventions as FIGS. 2A-D and 4A-B, to be discussed below. These illustration conventions are described with respect to FIG. 1A, but will not be repeated in the interest of brevity. FIG. 1A shows important components within a computer system that are involved in input and output ("I/O") data transfers. In FIG. 1A, a central processing unit ("CPU") 102, at least one level of cache memory 104, and main memory 106 are interconnected by a system bus 108. In FIG. 1A, an exemplary I/O device, disk drive 110, is controlled by a disk-drive controller 112. The disk-drive controller 112 is connected to an I/O bus 114, to which many additional I/O controllers, not shown in FIG. 1A, may be connected. A bus bridge device 116 interconnects the system bus 108 with the I/O bus 114. Bus bridge devices were initially devised in order to buffer timing and protocol differences between different types of buses, such as the high-speed, synchronous system bus 108 and the lower-speed, asynchronous I/O bus 114.

FIGS. 1B-D illustrate a READ operation initiated by the CPU to READ a block of data from the disk drive to system memory. The CPU 102 initiates the READ operation by controlling signal lines of the system bus 108 to direct a READ operation command to the disk-drive controller 112 via the system bus 108, bus bridge 116, and I/O bus 114. A microprocessor 118 within the I/O controller 112 receives the READ request and, in turn, when the requested data is not resident within a memory cache within the I/O controller, directs a disk READ request to the disk drive 110 and receives the requested data. Next, as shown in FIG. 1C, the I/O controller 112 transmits the requested data, read from the disk drive, back through the I/O bus 114, bus bridge 116, and system bus 108 to the CPU 102. Finally, as shown in FIG. 1D, the CPU writes the received data to one or both of the cache memory 104 and main memory 106. Of course, many additional details are involved in I/O-data transfers, including data buffering within I/O controllers and system memory, detailed device/control program interfaces, and other such details.

In early computers, the operation illustrated in FIGS. 1B-D was carried out for each word of data moved from the I/O controller 112 to memory 106. I/O data transfer was quickly identified as a bottleneck with respect to system performance, because the CPU devoted a large portion of available CPU cycles to I/O data transfers, and the latency for all types of tasks increased with the decrease in available CPU cycles. However, from the standpoint of security, the initial I/O data transfer method, illustrated in FIGS. 1B-D, afforded to a system designer the opportunity for highly secure I/O data transfer. In such systems, the CPU is directly involved in the transfer of each word, or unit, of data, and initiates all I/O data transfers. Moreover, only the CPU initiates READ and WRITE operations directed to system memory and the CPU generally allocates a portion of memory 120 to be used as an I/O data buffer. With appropriate operating system implementation, I/O data transfers can be restricted to read from, and write to, only the portion of system memory 120 allocated as an I/O buffer region.

The performance bottleneck caused by direct CPU intervention in each word-sized I/O data transfer motivated system designers to introduce I/O controllers into systems to manage I/O data transfer, offloading much of the processing overhead of I/O data transfers from the CPU to the system controller. FIGS. 2A-D illustrate a direct-memory access ("DMA") method for facilitating and controlling I/O data transfer. Comparing FIG. 2A to FIG. 1A, it can be seen that a new processing element 202 is introduced into I/O controller 112. The new processing element 202 is referred to as a DMA engine. In many systems, DMA engines may be included in various other system components, including system controllers. In many systems, multiple DMA engines are employed. Regardless of how many DMA engines are present, and where the DMA engines are located, DMA engines allow for direct, DMA-mediated I/O data transfers by external devices, such as I/O controllers, to main memory 106.

A READ operation carried out using DMA-mediated I/O data transfer is illustrated in FIGS. 2B-D. First, as shown in FIG. 2B, the CPU 102 initiates the READ operation by controlling signal lines of the system bus 108 to send a READ message to the disk-drive controller 112, as in the previous method shown in FIG. 1B. Note, however, that in some systems, the CPU must also, in a separate step, initialize the system controller 116 with system-bus/I/O-bus translations in order to carry out the subsequent READ operation. Next, in FIG. 2C, the disk-drive controller 112 interacts directly with the DMA engine 202 to prepare for the READ operation. Finally, as shown in FIG. 2D, the disk-drive controller 112 repeatedly accesses the disk-drive 110 to fetch successive blocks of stored data and transfers the data, under control of the DMA engine 202, to main memory 106. Following completion of the READ operation, the disk-drive controller may return a READ completion acknowledgment, via an interrupt, to the CPU 102.

DMA-mediated I/O data transfer offloads an enormous amount of processing from the CPU, and even low-end, modern computers generally employ a number of cascaded DMA engines in order to preserve sufficient CPU processing cycles for modern system needs. However, unlike in the original I/O data transfer method, illustrated in FIGS. 1A-D, the processor no longer has direct control over each access to main memory. Instead, an I/O controller may initiate READ or WRITE operation, via the DMA engine, directed to main memory. This direct access by a processing element external to the CPU may constitute a significant potential security vulnerability, because memory protections mechanisms are commonly built into the processor, including privilege levels and attributes associated with memory regions. For this reason, designers, manufacturers, and users of computer systems, and, particularly designers of secure computer systems, have recognized the need for a method and system that allows offloading I/O-data-transfer processing from one or more CPUs of a computer system, but that does not expose portions of memory containing confidential information to processing elements external to the CPU.

SUMMARY OF THE INVENTION

One embodiment of the present invention is a device, such as a bus bridge or system controller, that assists a secure computing system in protecting system resources, accessible via one or more system busses, from unregulated access by DMA-engine-containing devices, such as I/O controllers. The bus bridge or system controller includes access-right-checking logic, is initially configured by a secure kernel within a secure computer system, and is configured for I/O transfers, to verify access rights of non-trusted downstream entities that attempt to access system memory, or other system resources accessible by READ/WRITE operations through the through a system bus via a system controller or bus bridge. By checking access rights, the bus bridge or system controller ensures that non-trusted processing entities access only those particular regions of system memory or services offered by other system resources authorized for access by the secure kernel. Other embodiments provide direct access to computer system resources by a non-trusted processing entity running in an unprivileged state that requests access to the resource through a device that directly accesses the resource. The device includes access-right-checking logic and is configured to verify access rights of non-trusted processing entities that attempt to access the resource through the device. By checking access rights, the device ensures that non-trusted processing entities access only those particular portions of the resource authorized for access by the secure kernel.

DETAILED DESCRIPTION OF THE INVENTION

One embodiment of the present invention relates to methods, and systems using the methods, for maintaining secure control over system memory and other system resources while, at the same time, offloading I/O-data-transfer processing from system processors to I/O controllers, system controllers, and DMA engines. The method of the present invention can be employed in a wide variety of computer systems, but may be particularly usefully employed in new generations of secure computer systems currently under design.

The design for one, new-generation secure computer system that can be implemented using the Intel IA-64 processor architecture, and other modern processor architectures that provide similar features, is described in U.S. patent application Ser. No. 10/118,646, filed on Apr. 8, 2002 by Worely et al. ("Worely"), hereby incorporated by reference within the current application.

Figure 1A:
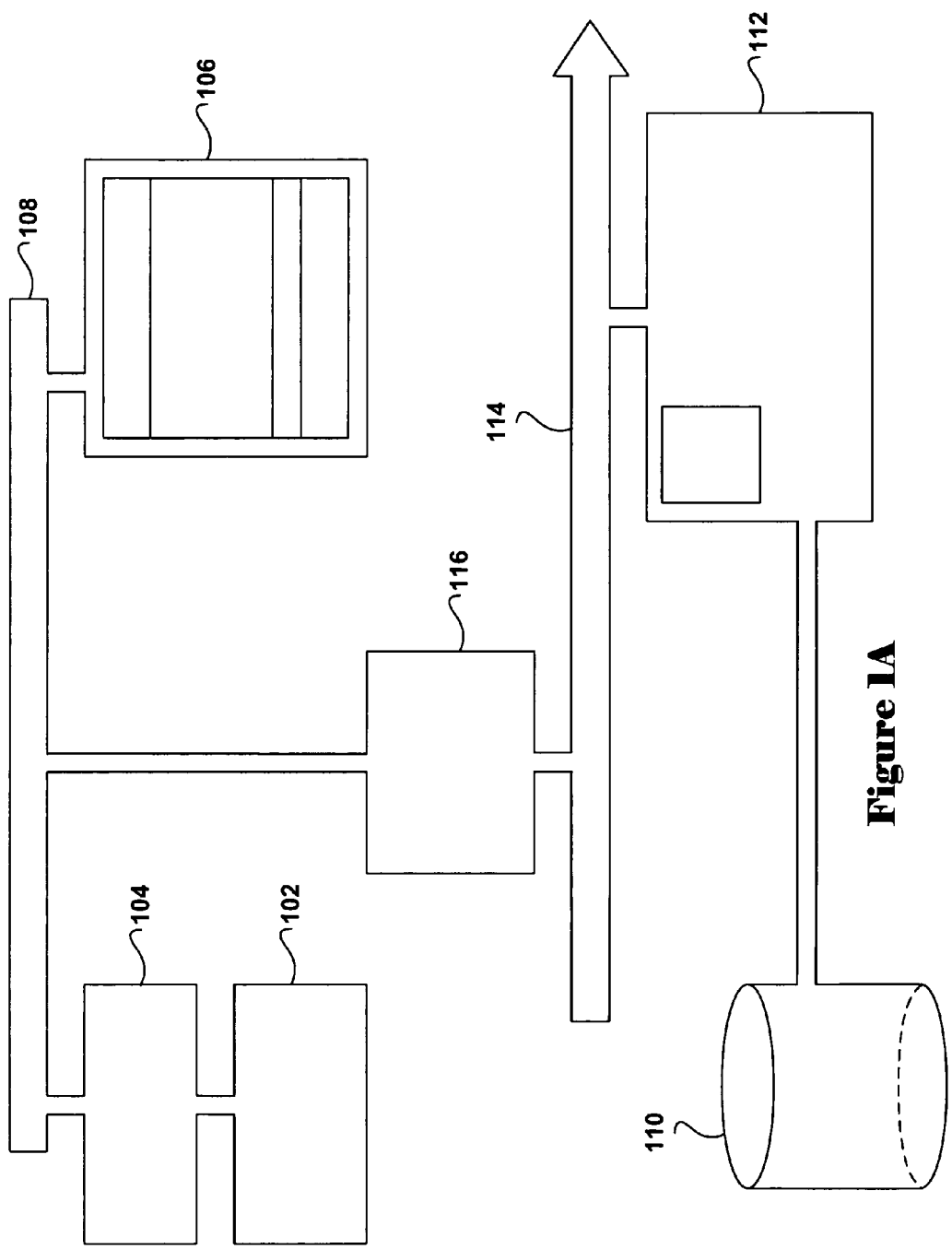
FIGS. 1A-D illustrate an initial approach employed within computer systems to transfer data back and forth between internal memory and mass storage devices and communications devices.
Figure 1B:
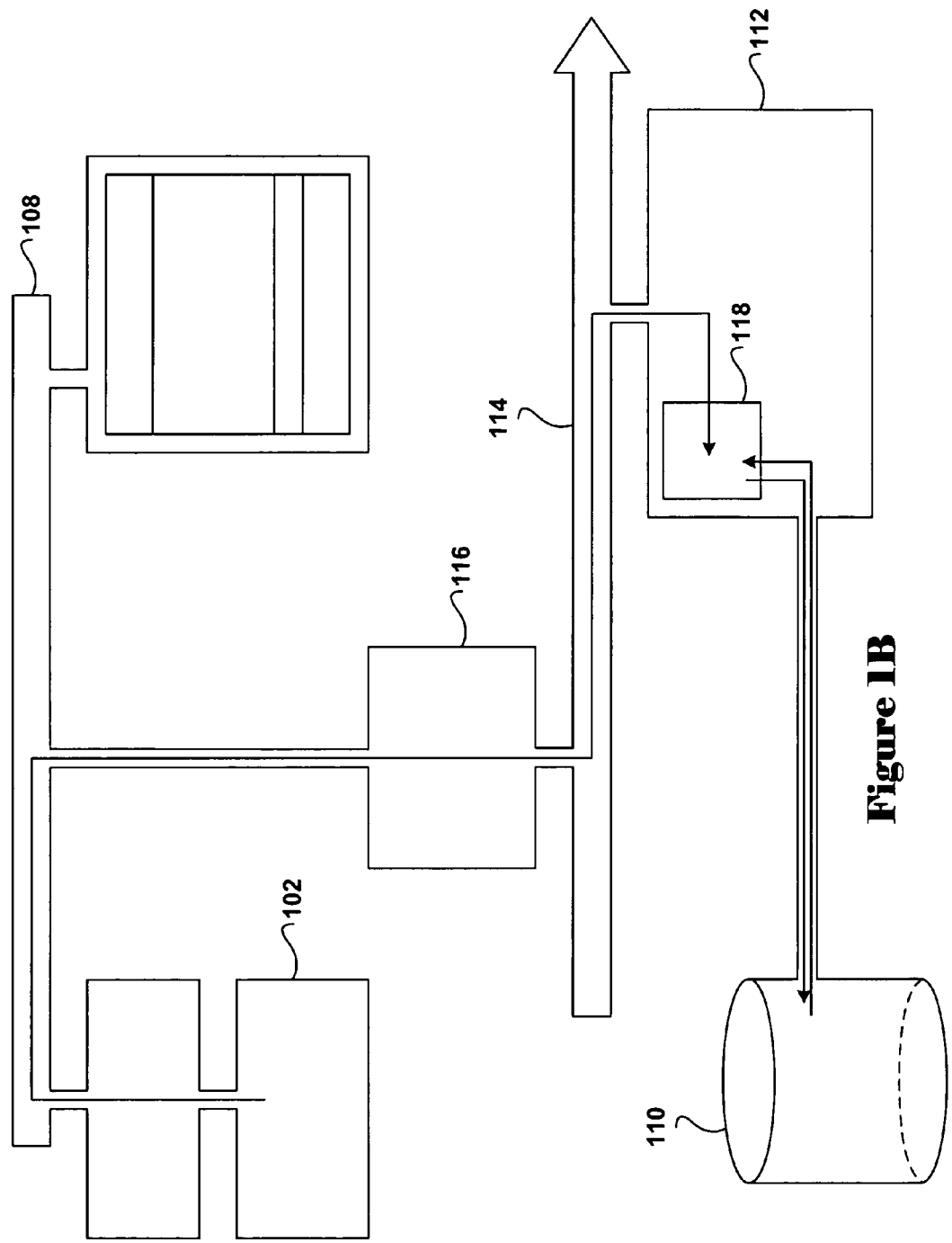
Figure 1C:
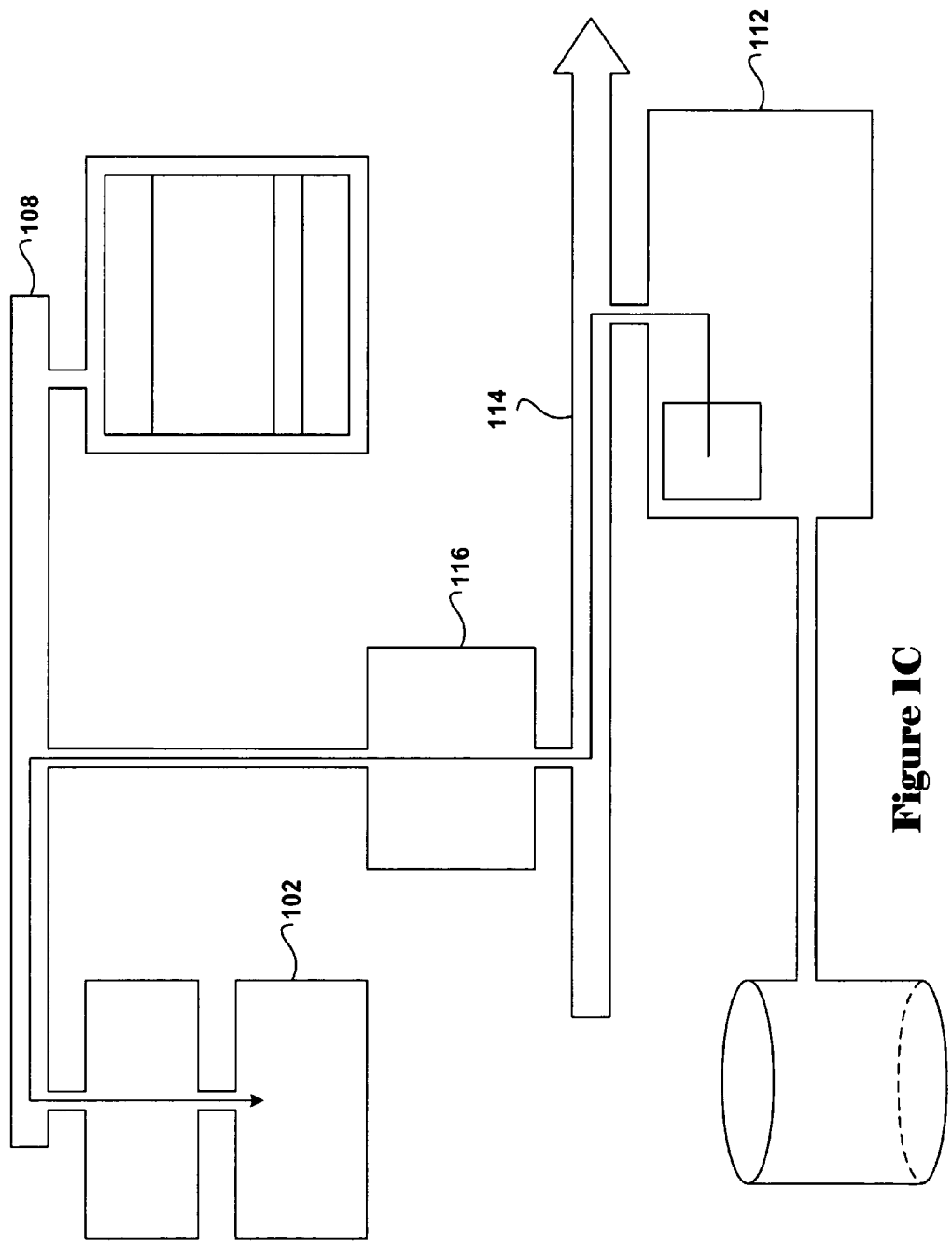
Figure 1D:
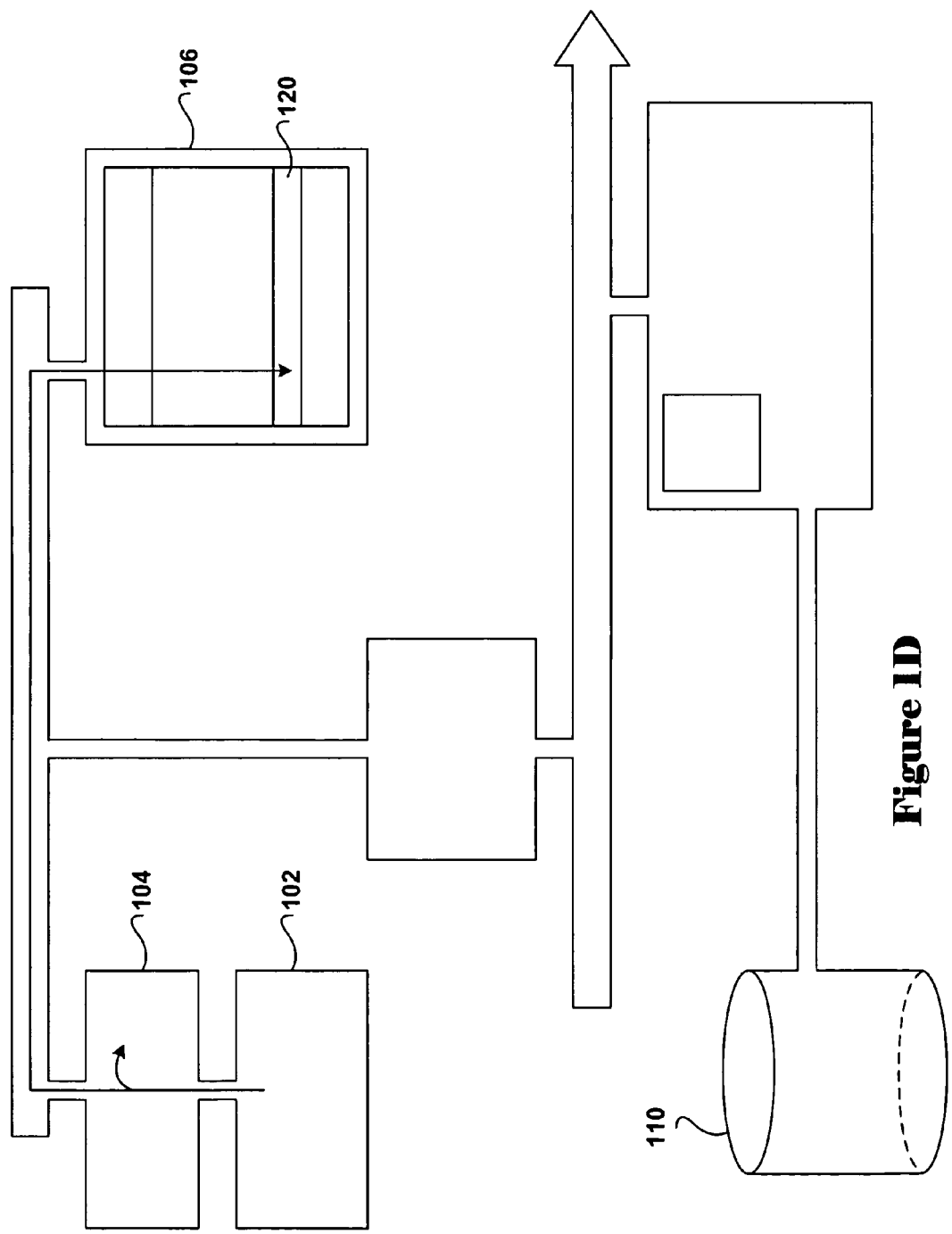
Figure 2A:
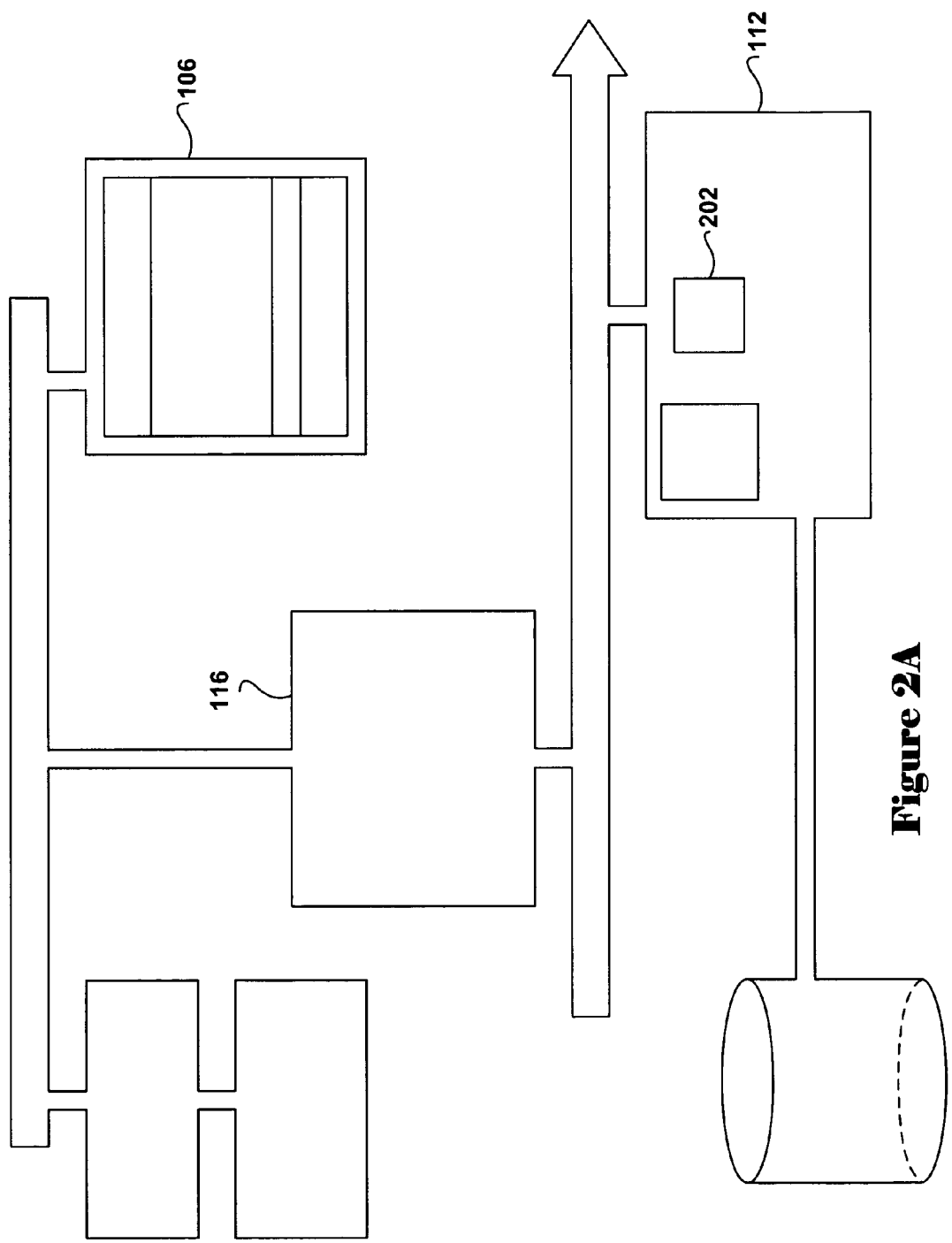
FIGS. 2A-D illustrate a direct-memory access method for controlling I/O data transfer.
Figure 2B:
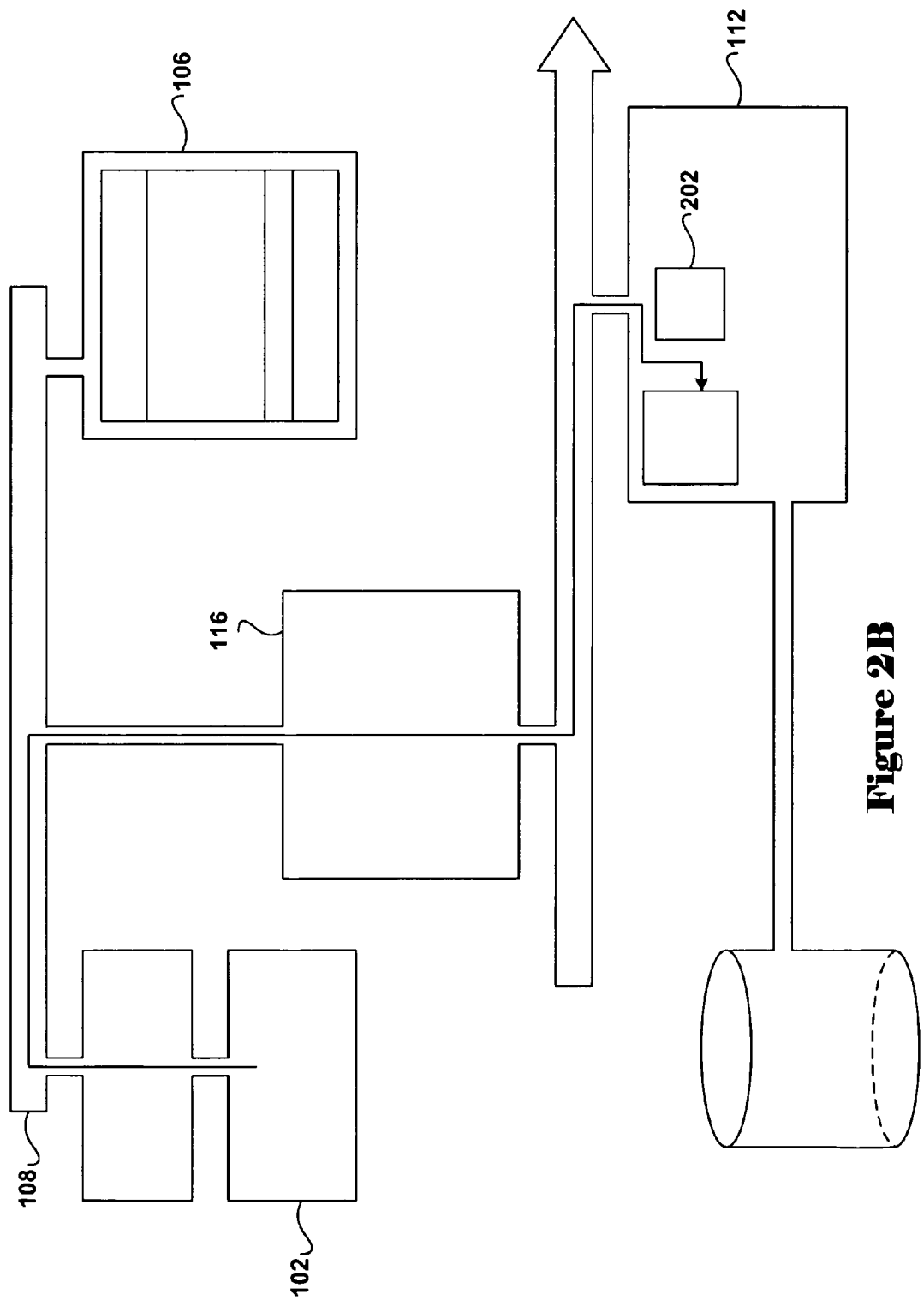
Figure 2C:
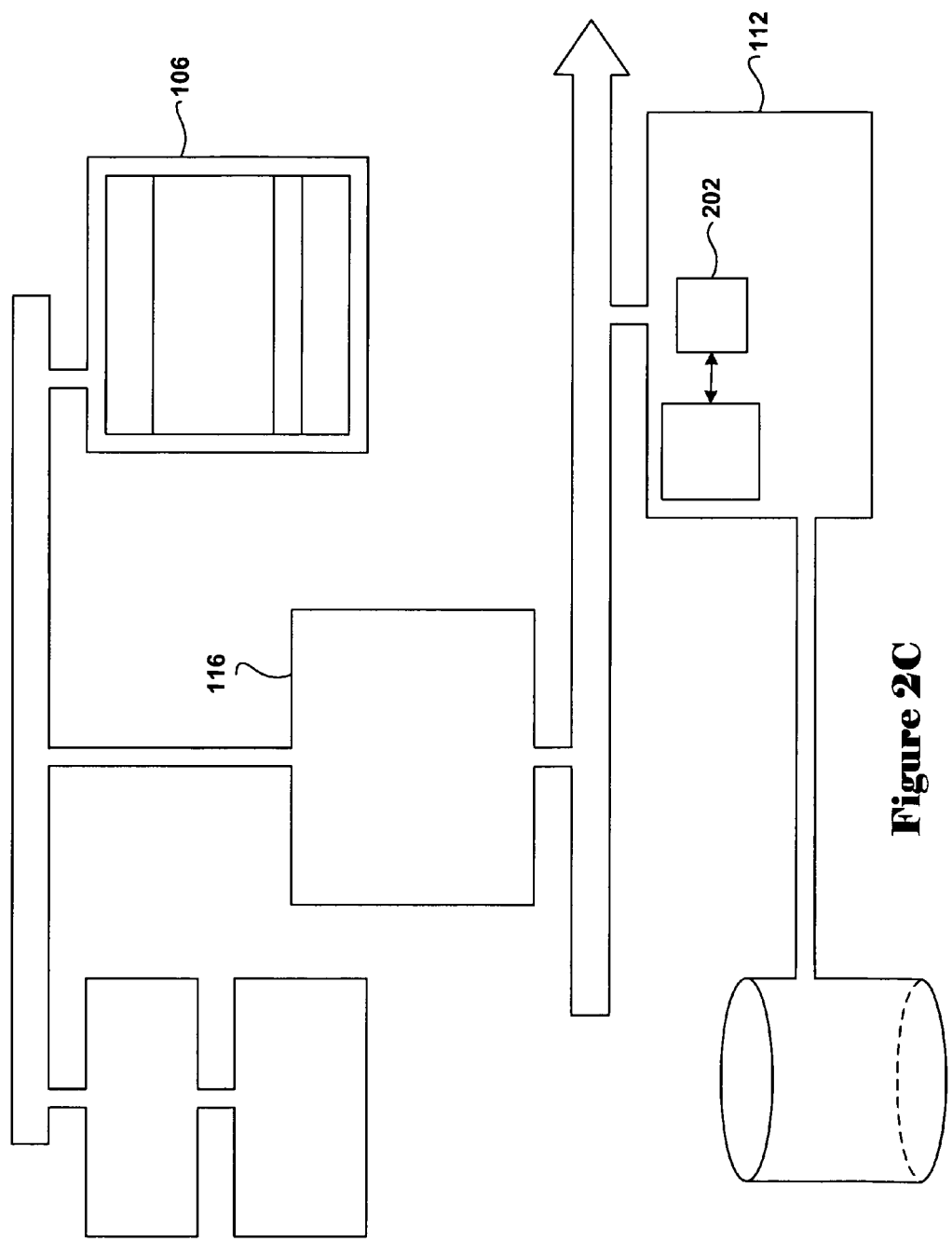
Figure 2D:
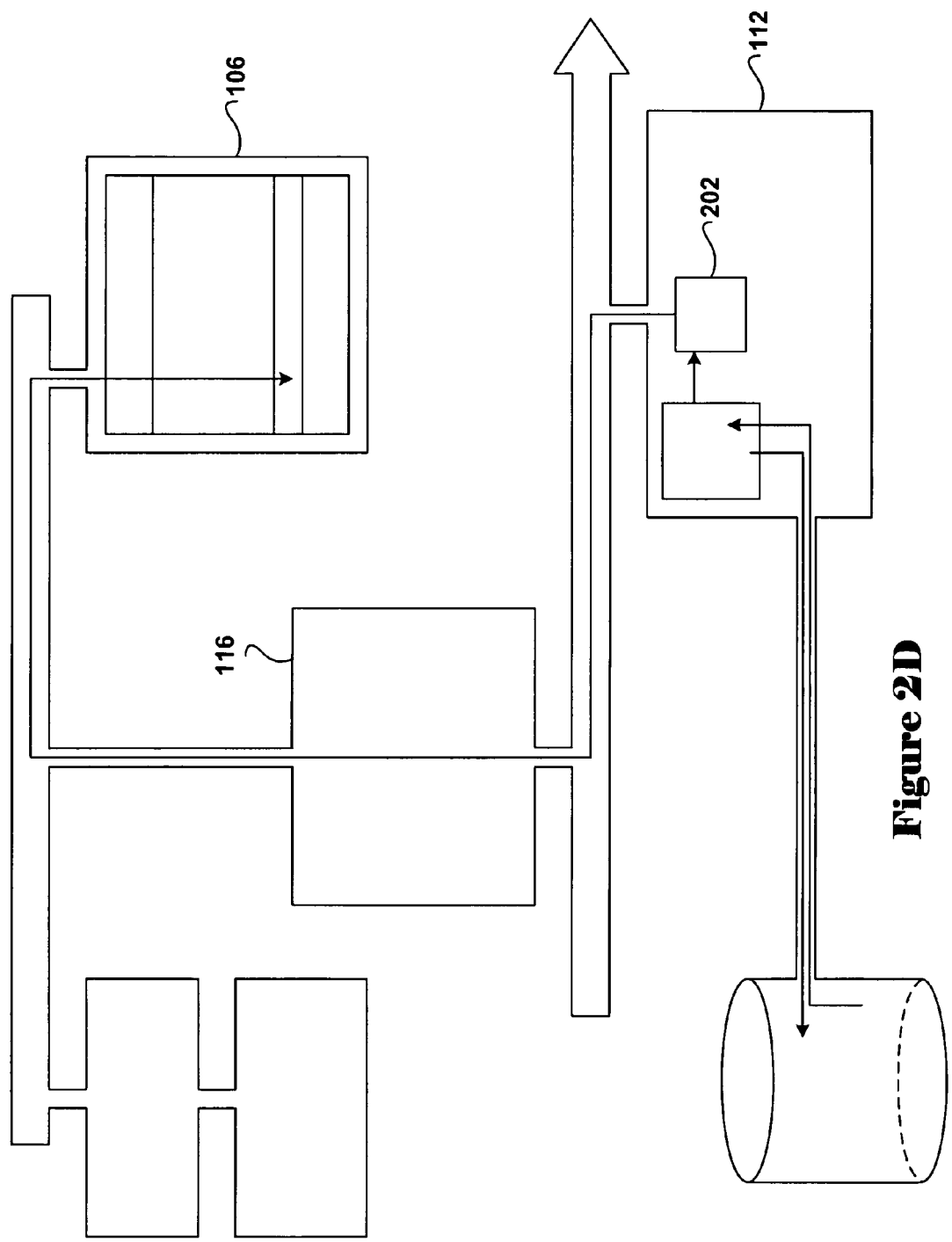
Figure 3A:
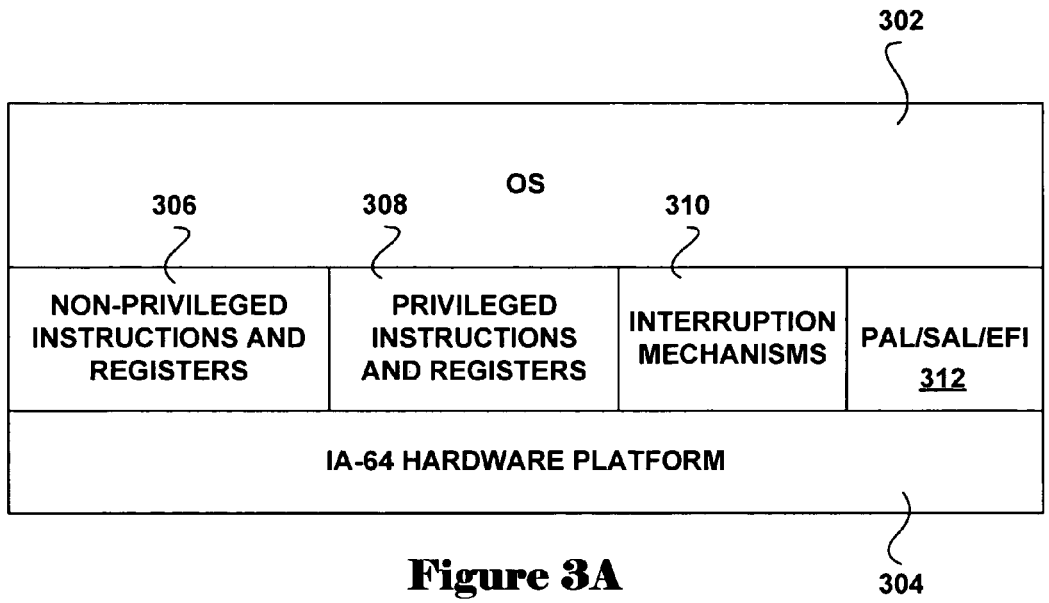
FIGS. 3A-B illustrate an approach to designing a secure computer system.
Figure 3B:
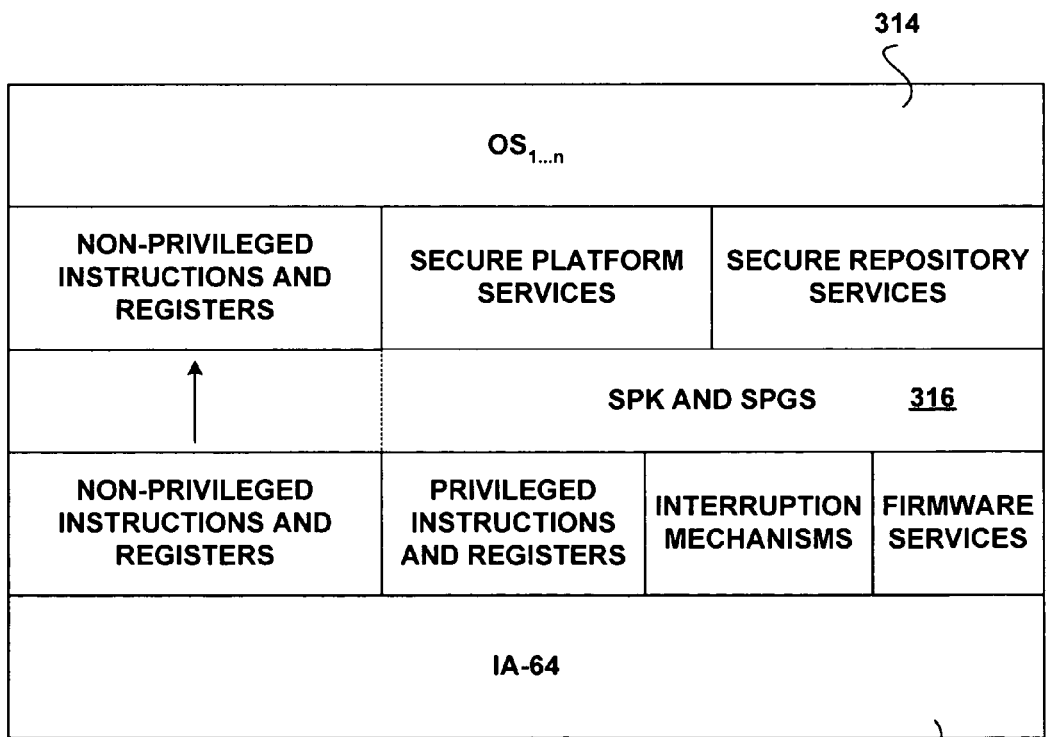

FIGS. 3A-B illustrate an approach to computer system security described in Worley. In a traditional computer system, as shown in FIG. 3A, an operating system 302 is layered directly onto a hardware platform 304. In this case, the hardware platform is the IA-64 processor architecture with an interface that includes non-privileged instructions and registered 306, privileged instructions and registers 308, interruption mechanisms 310, and a firmware interface 312, along with many other hardware components to which one or more IA-64 processors interface directly or indirectly. In the new, secure-system architecture disclosed in Worley, one or more operating systems 314 interface to a secure-platform kernel ("SPK") and secure-platform global services ("SPGS") software layer 316, referred to below as the "SPK/SPGS layer" or as the "secure kernel," which, in turn, interfaces to the IA-64 processor architecture 304. The SPK/SPGS layer 316 shields and protects all but the non-privileged instructions and non-privileged registers of the underlying hardware architecture from access by operating systems and higher-level software programs and utilities. The SPK, by exclusively interfacing to the privileged instructions and registers, interruption mechanisms, and firmware services interfaces, maintains exclusive control over internal system resources. Of course, an operating system running on top of the SPK may access memory, may create operating-system-specific memory-based data structures, and may have device drivers to carry out I/O, but the operating system is provided access to only certain portions of system memory and other resources, and cannot access the entire memory. This allows the SPK to maintain confidential information in memory, including encryption keys and passwords, that cannot be accessed by an operating system, third-party applications or controllers, and/or other processes and computing entities.

Figure 4A:
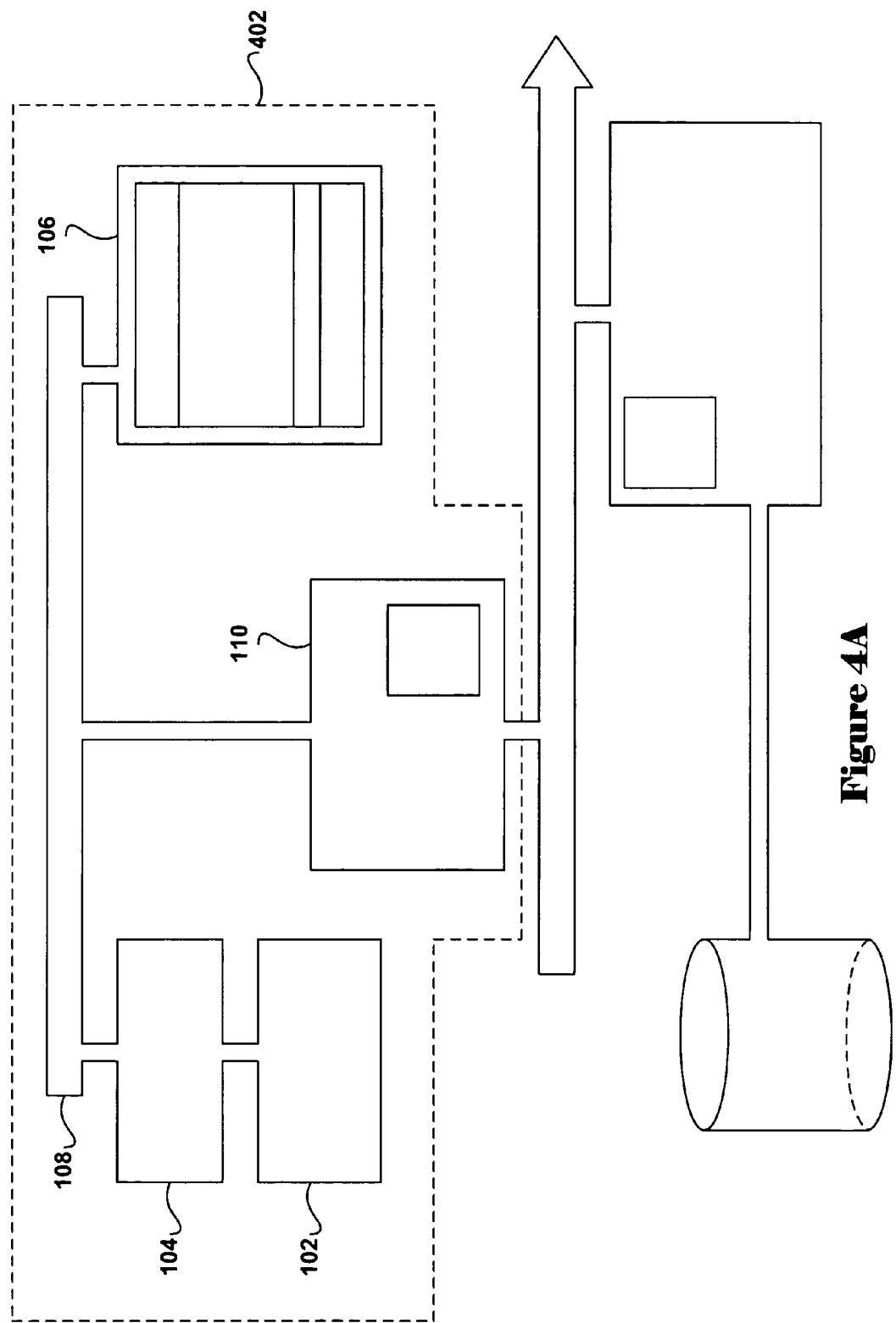
FIGS. 4A-B illustrate conceptual boundaries of the SPK/SPGS layer and underlying hardware.
Figure 4B:
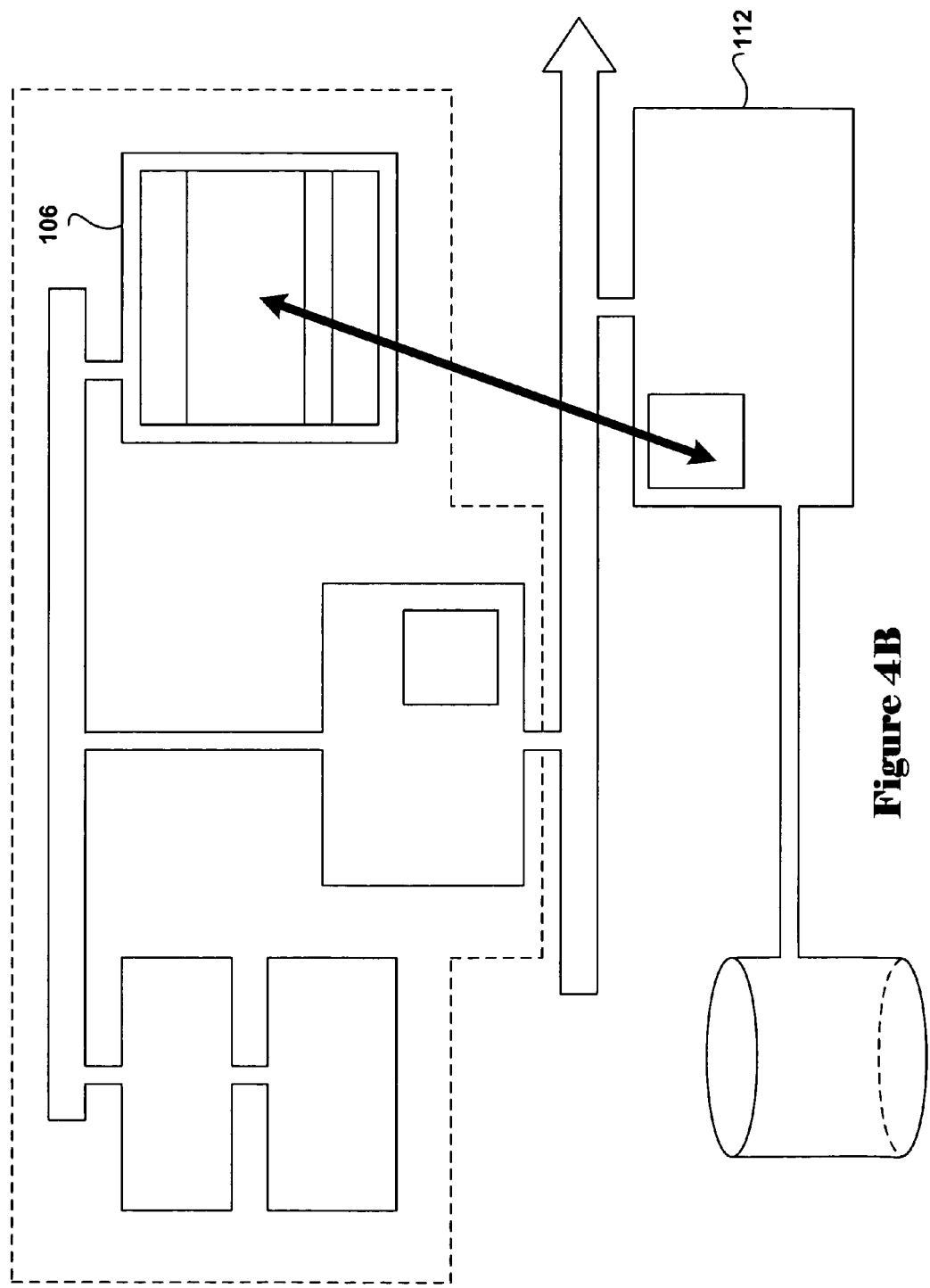

FIGS. 4A-B illustrate conceptual boundaries of the SPK/SPGS layer and underlying hardware. In FIG. 4A, a dashed line 402 encloses the CPU 102, cache memory 104, main memory 106, system bus 108, and system controller 110. This dashed line encloses internal system resources under the exclusive control of the SPK/SPGS layer (316 in FIG. 3B). In order to ensure a secure system, a device not controlled directly by the SPK/SPGS layer cannot be allowed to directly control components within the group of components surrounded by the dashed line 402. However, as shown in FIG. 4B, the presence of the DMA-mediated I/O-data-transfer mechanism, described above, directly violates the necessity for exclusive control of internal system resources, most particularly system memory, by the SPK/SPGS layer. As seen in FIG. 4B, and discussed above, the DMA engine provides a means for an I/O controller, such as disk-drive controller 112, to directly access main memory 106. As another example, an operating system or device driver executing on top of the secure kernel may employ a DMA-containing resource-accessing device to avoid accessing system resources, such as system memory, through the SPGS/SPK interface, but to instead access system memory directly.

Figure 5A:
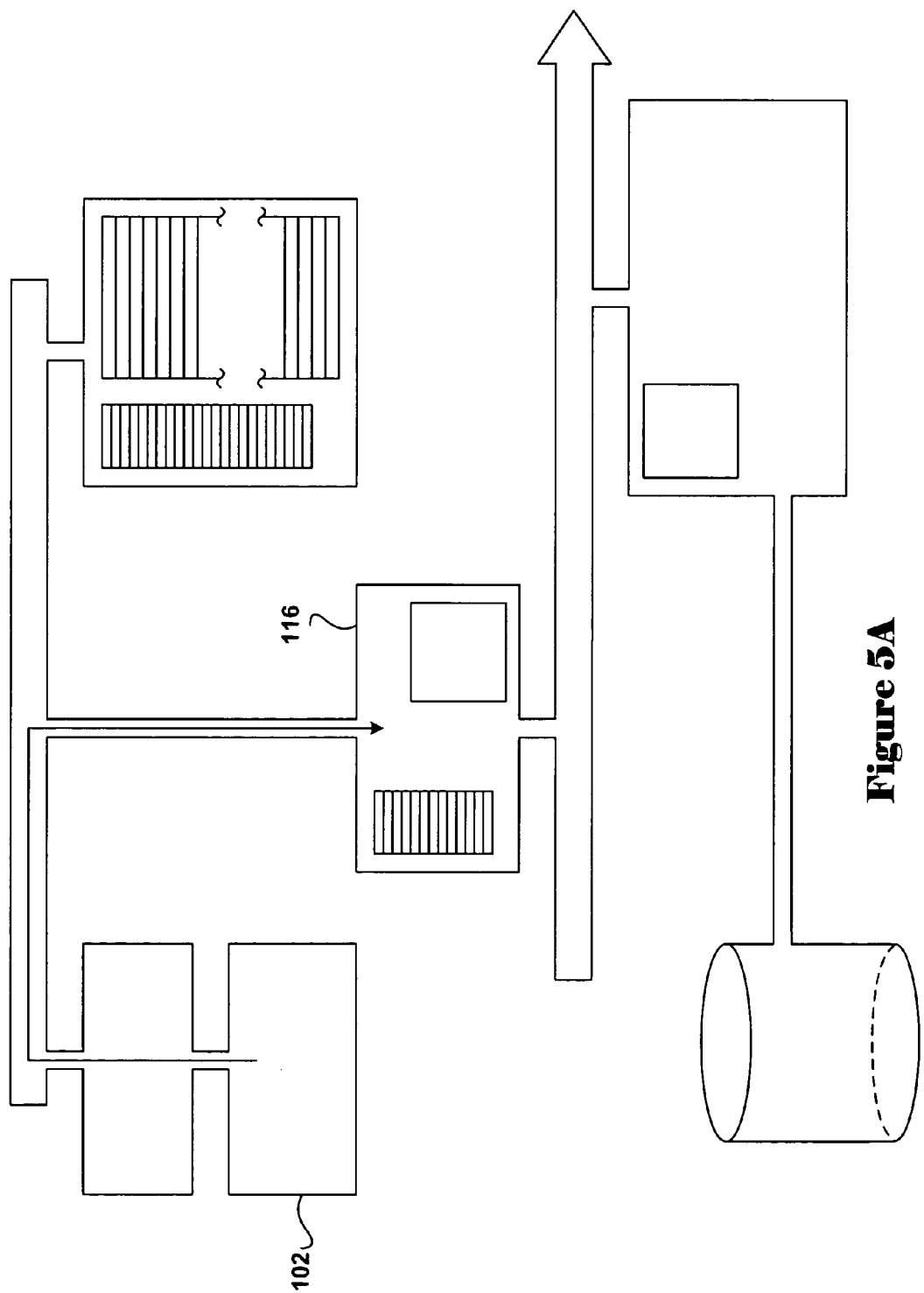
FIGS. 5A-E illustrate operation of a secure bus bridge or secure system controller that represents one embodiment of the present invention.

A reliable and robust method for addressing the problem described, above, with reference to FIG. 4B, is to enhance a bus bridge or system controller (116 in FIGS. 1, 2, and 4) with access-authorization logic in order to filter commands directed to the bus bridge or system controller from non-trusted processing entities, such as an I/O controller (112 in FIGS. 1, 2, and 4) or operating-system device driver. The enhanced bus bridge or system controller is referred to, below, as a "secure bus bridge" or a "secure system controller." FIGS. 5A-F illustrate operation of a secure bus bridge or secure system controller that represents one embodiment of the present invention. First, as shown in FIG. 5A, the secure kernel executing within the processor 102 initializes the secure bus bridge or system controller 116. Note that the secure-bus-bridge or secure-system-controller control registers are protected by the memory management unit or units of the processor or processors in the secure system from access by unprivileged routines. The secure kernel and secure bus bridge or system controller may exchange digital signatures or follow some alternative authorization protocol so that both the secure kernel and secure bus bridge or system controller can each determine that they are communicating with a trusted processing entity.

Figure 5B:
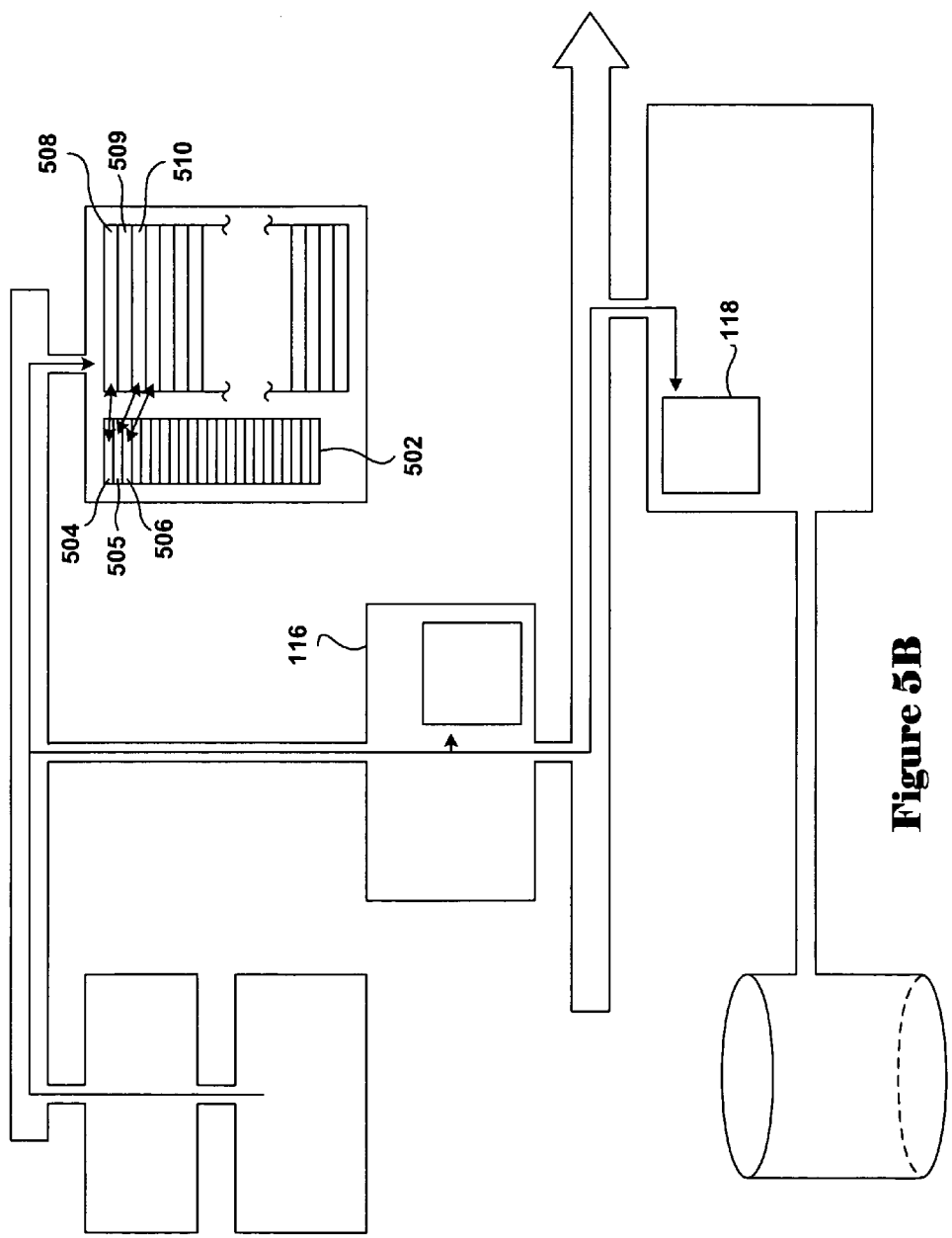

Prior to DMA-mediated I/O data transfer, the secure kernel stores enabling access rights in an access-rights table 502 within protected system memory and carries out any setup or I/O-transfer initialization with respect to the secure bus bridge or system controller 116. As shown in FIG. 5B, the secure kernel places entries into the access-rights table 502, each entry corresponding to a particular region of memory, commonly a fixed-length page. In general, physical memory pages are associated with access rights, although, in certain complex systems, virtual-memory pages may be associated with access rights. In the example shown in FIG. 5B, the secure kernel places access-rights-table entries 504-506 into the access-rights table 502 in order to authorize access by a particular non-trusted processing entity to memory pages 508-510, respectively. The details of the access-rights table and access-rights table entries are discussed, below, with reference to FIGS. 6-7.

Figure 5C:
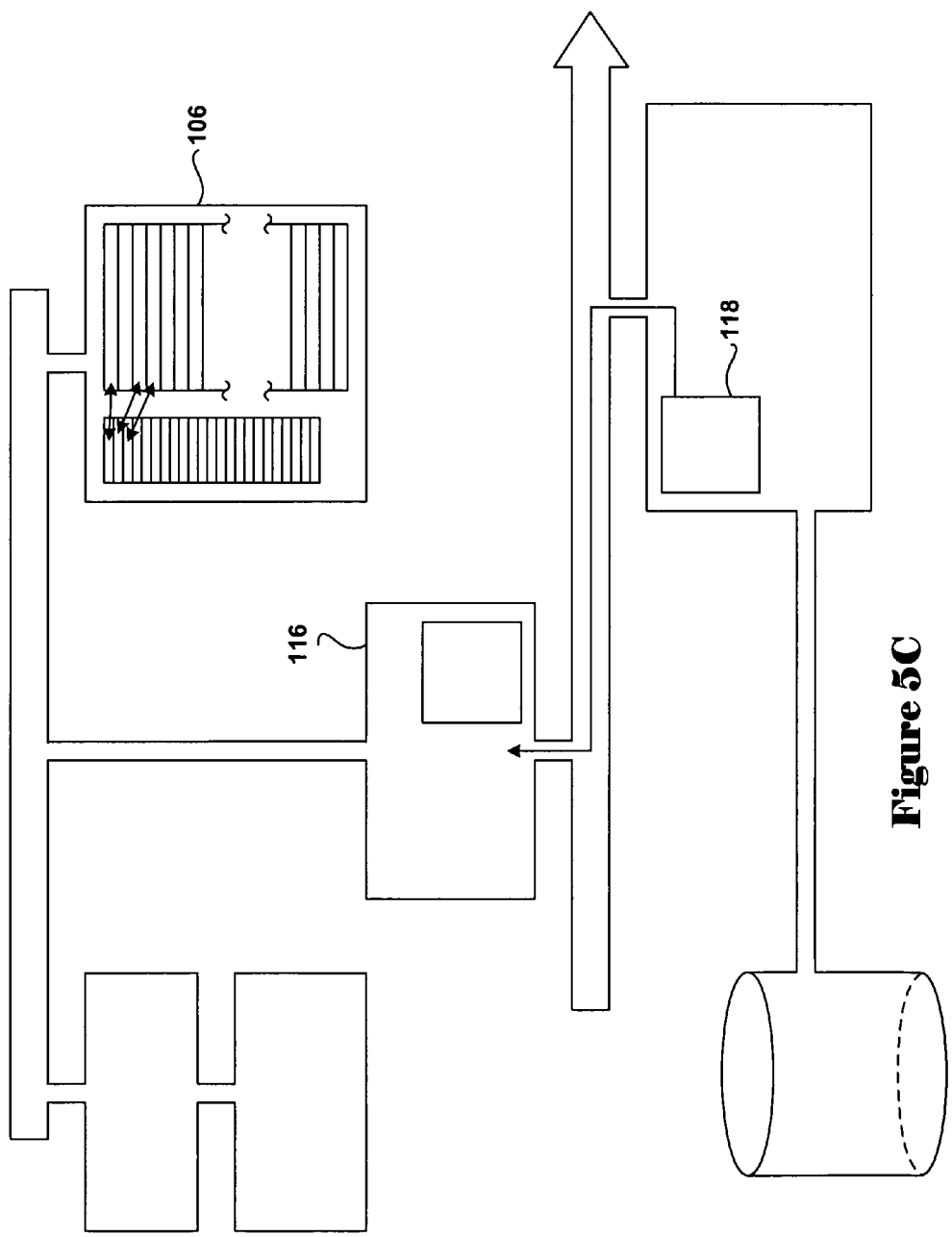
Figure 5D:
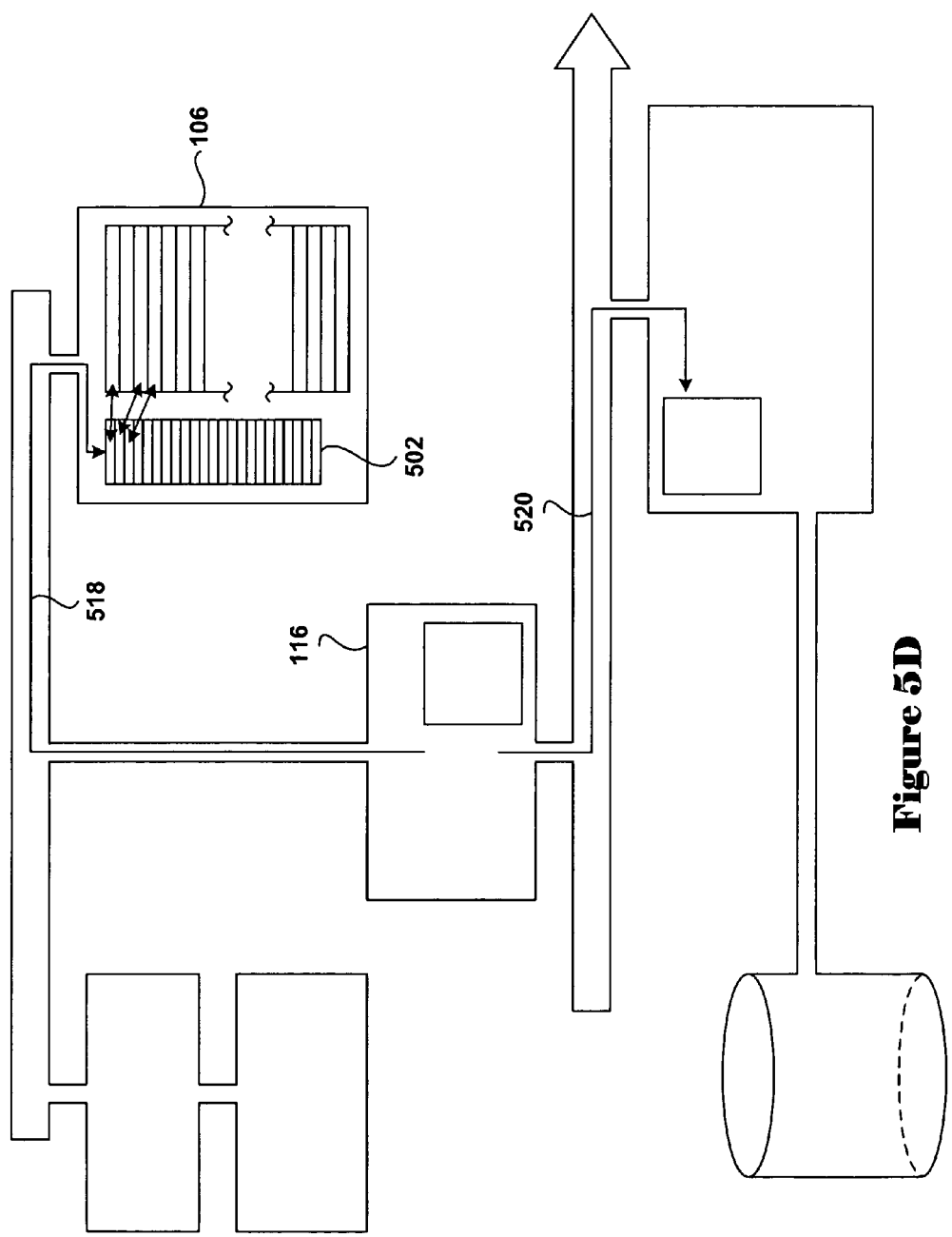
Figure 5E:
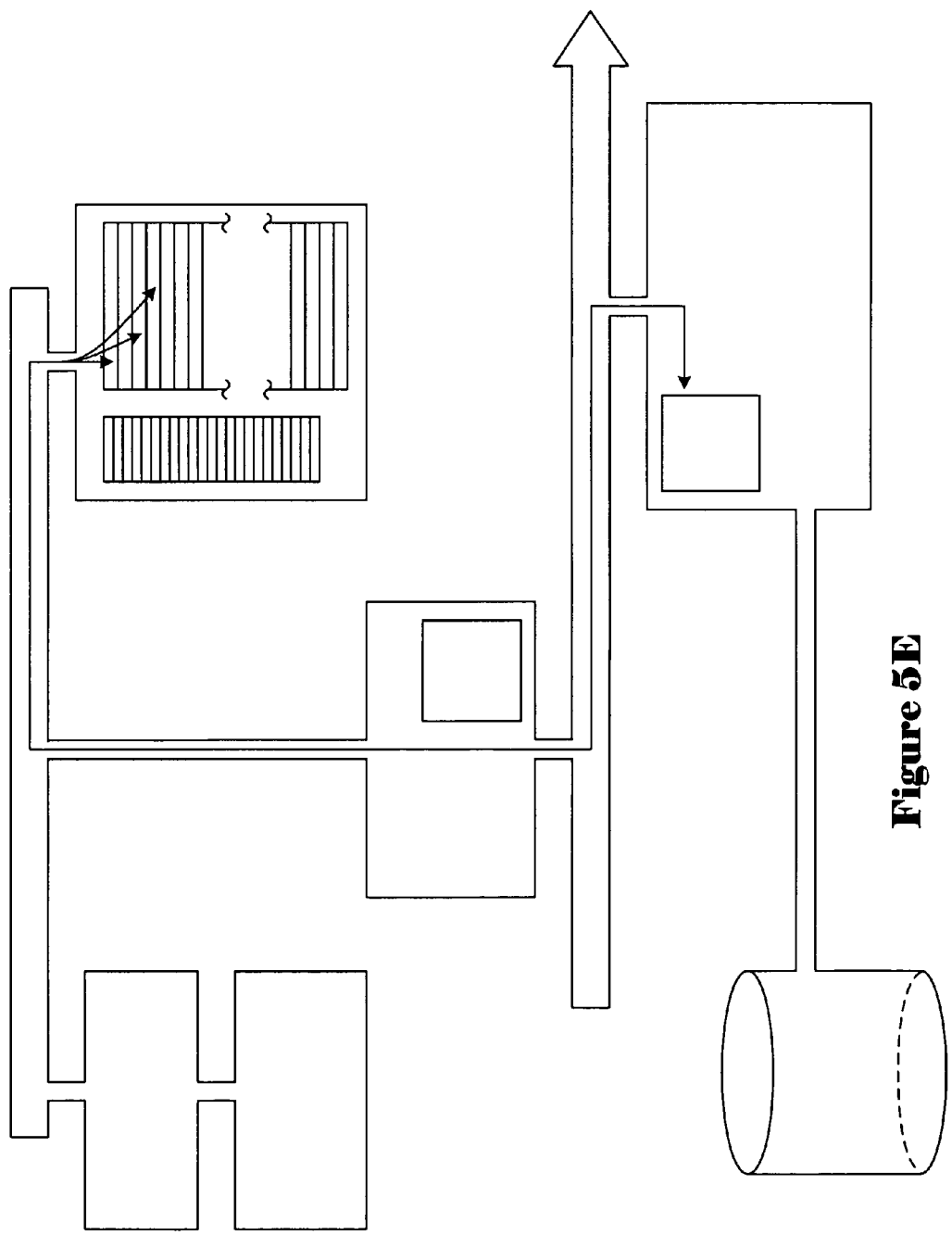

Next, as shown in FIG. 5C, a non-trusted processing entity, an I/O controller 118 under the control of unprivileged software, in the example shown in FIG. 5C, directs an I/O transfer to system memory 106 via the secure bus bridge or system controller 116. Upon receiving the I/O transfer request from the non-trusted processing entity, the secure bus bridge or system controller determines whether or not to authorize the I/O transfer by accessing the access-rights-table 502 to check that the I/O controller has access rights to the affected system-memory pages as shown in FIG. 5D. The secure bus bridge or system controller may first attempt to find access-rights entries in a local access-rights-table cache prior to accessing the access-rights-table 502 in system memory. The secure bus bridge or secure system controller needs to find a corresponding access-rights-table entry for each memory page, or other memory region, specified for access in the I/O transfer command. If the secure bus bridge or system controller can find a corresponding access-rights-table entry for each memory page, then the secure bus bridge or system controller compares the type of I/O transfer requested, for example, a READ I/O transfer or WRITE I/O transfer, with the corresponding access-rights-table entry to determine whether the secure kernel has authorized the specified access. The access-rights entries may also explicitly authorize access by the particular non-trusted processing entity making the I/O transfer request. When the secure bus bridge or system controller cannot find access-rights entries corresponding to the specified memory pages in the I/O transfer command, when the access-rights entries do not authorize the type of access requested, or when the non-trusted processing entity is not explicitly authorized to access the memory pages in systems that support access rights on a per-non-trusted-processing-entity basis, then the secure bus bridge or system controller may log an error entry into system memory or another data-storage component of the secure system, and may return an error code to the non-trusted processing entity which directed the I/O transfer command to the I/O secure bus bridge or system controller. When the secure bus bridge or system controller can find access-rights entries that authorize the access specified in the I/O transfer command, then the secure bus bridge or system controller enables DMA-mediated access to system memory as requested in the I/O transfer command, as shown in FIG. 5E.

The secure kernel may need to flush particular access-rights entries from the access-rights table, and from a local access-rights cache, in cases where such a cache is used, following the completion of an I/O transfer, reallocation of memory pages, change in access-rights associated with a memory pages, and for other reasons. Access-rights table maintenance and local-cache flushing policies need to be implemented in tandem with the secure kernel, to ensure that access-rights are extended to only a well-defined set of non-trusted processing entities and for well-defined periods of time, to prevent open-ended access, overlapping access to a particular portion of a resource by multiple non-trusted entities, and continued access to a portion of a resource following a significant change in state of the resource, device, or non-trusted processing entities.

Figure 6:
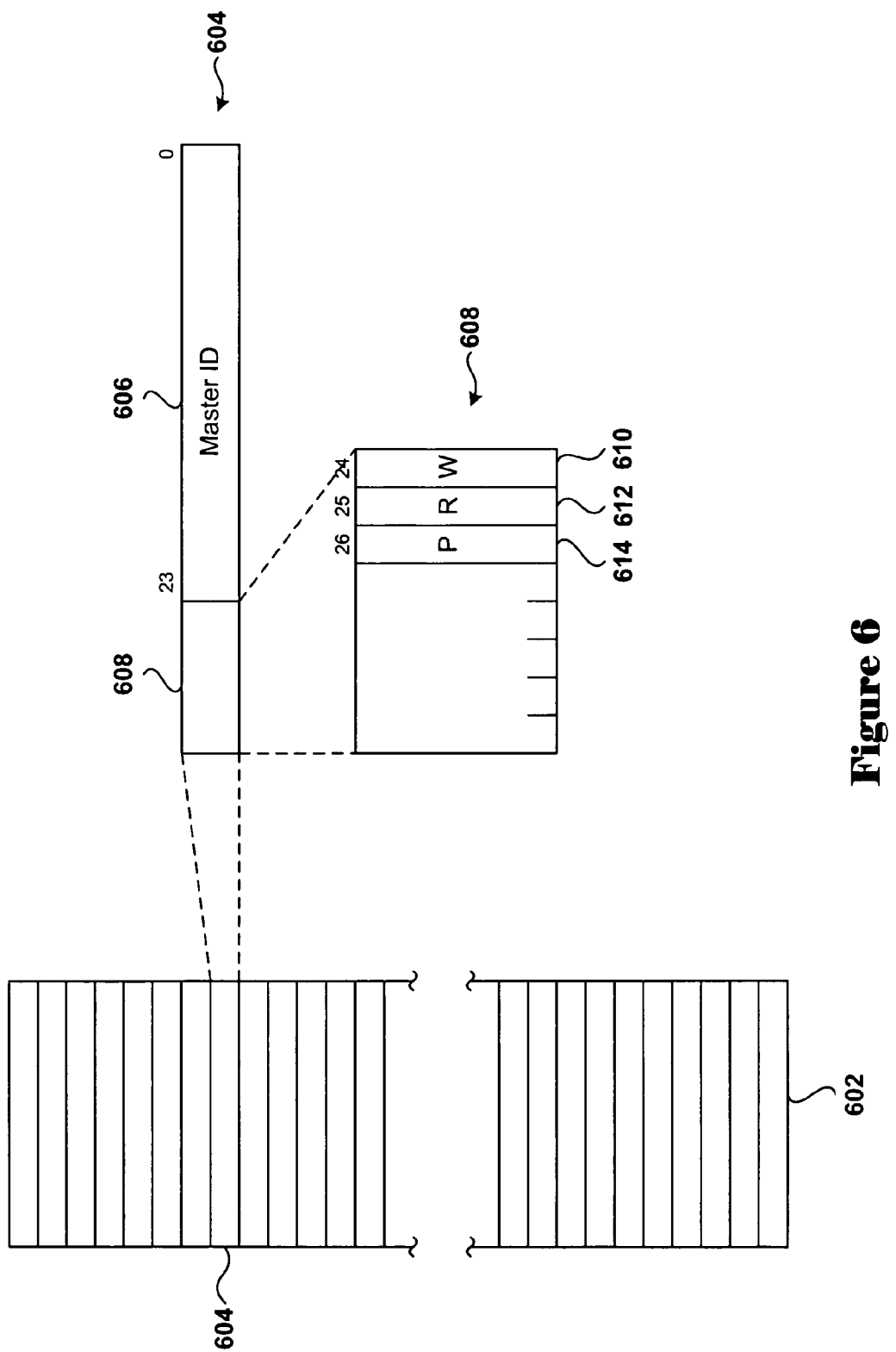
FIG. 6 illustrates the contents of an access-rights-table entry.

FIG. 6 illustrates the contents of an access-rights-table entry. As shown in FIG. 6, the access-rights table (502 in FIG. 5B) 602 can be thought of as a set of access-rights entries. In one embodiment, each access-rights-table entry corresponds to a physical memory page, and the access-rights-table entry corresponding to a particular physical memory page can by using a portion of the memory-page address as an index into the access-rights table. In one embodiment, each access-rights-table entry, such as access-rights-table entry 604, is a 32-bit word that contains a 24-bit master ID value 606 and an array of bit flags 608. In one embodiment, the bit flags include a WRITE access flag 610, a READ access flag 612, and a PeerIO flag 614. READ, WRITE, and READ/WRITE access is indicated by the READ and WRITE access flag values "10," "01," and "11," respectively. When the PeerIO flag has the value "0," then I/O peer-to-peer address checking is allowed. When the PeerIO access flag has the value "1," then only system memory checking is allowed. In general, for secure operation, the PeerIO flag is set, to prevent a DMA engine from accessing registers and buffers within other I/O controllers interconnected through another I/O bridge. The 24-bit master ID uniquely identifies a particular non-trusted processing entity, or set of entities that share a unique ID, such as an I/O controller or controllers. Thus, the secure kernel authorizes a particular type of access to a particular virtual-memory page by a particular non-trusted processing entity by placing an access-rights-table entry corresponding to that page into the access-rights table.

The access-rights-table can be implemented in many different ways. For example, a sparse-array implementation may be used. Alternatively, ignored fields in architecture-specified page tables or other system data structures might be used. In another implementation, the access-rights-table may be stored in registers within a secure bus bridge or secure system controller. In FIG. 6, the access-rights table 602 is represented as an array, or column, of access-rights-table entries. The entry corresponding to a particular memory address may, in some implementations, be found by computing an index for the entry using the memory address. In other implementations, memory addresses may be explicitly included in access-rights-table entries.

Figure 7:
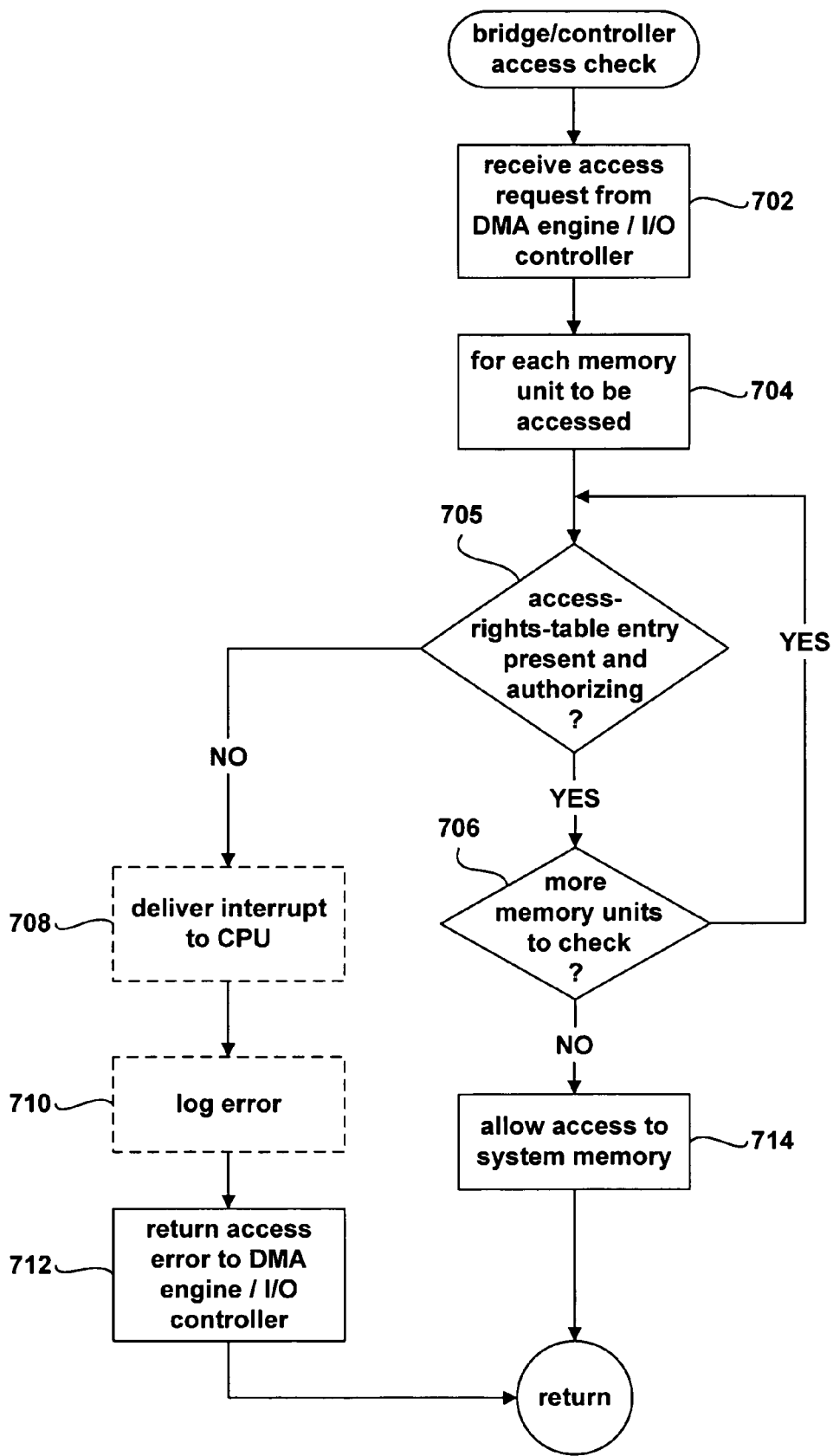
FIG. 7 is a flow-control diagram that represents the DMA-mediated-access-authorization logic added to a bus bridge or system controller to produce a secure bus bridge or system controller that represents one embodiment of the present invention.

FIG. 7 is a flow-control diagram that represents the DMA-mediated-access-authorization logic added to a bus bridge or system controller to produce a secure bus bridge or system controller that represents one embodiment of the present invention. In step 702, the secure bus bridge or system controller receives a system-memory-access request, such as an I/O transfer command from a non-trusted processing entity. In for-loop comprising steps step 704-706, the bus bridge or system controller checks the access-rights table cache (502 in FIG. 5B) to see if an access-rights-table entry corresponding to each memory unit specified for access in the received system-memory-access request can be found that authorizes the access specified in the received system-memory-access request. An authorizing access-rights-table entry is an entry for the specified system-memory unit, such as a memory page with bit-flags (608) authorizing the type of access, for example, a READ or WRITE access, and with a Master ID field (606 in FIG. 6) corresponding to the identity of the non-trusted processing entity from which the system-memory-access request was received. The identity of the non-trusted processing entity may be determined by the secure bus bridge or secure system controller based on its I/O bus address. If the bus bridge or system controller cannot find an authorizing access-rights-table entry, as detected in step 705, then the secure bus bridge or system controller may deliver an interrupt to a CPU in step 708, may log an error to a secure error logging storage component in step 710, and returns an error to the requesting non-trusted processing entity in step 712. However, if authorizing access-rights-table are found in the access-rights table for each specified memory unit, then the secure bus bridge or secure system controller, in step 714, allows the received system-memory-access request to be carried out by providing access to the specified memory units in system memory.

Although the present invention has been described in terms of a particular embodiment, it is not intended that the invention be limited to this embodiment. Modifications within the spirit of the invention will be apparent to those skilled in the art. For example, as discussed above, any of the large variety of different types of organization and management schemes may be employed to store the access-rights table in memory. In the above-described embodiment, access-rights entries generally correspond to a single, or multiple contiguous virtual-memory pages, with provision for a certain number of access-rights entries representing 16-byte regions of memory. In alternate embodiments, access-rights entries may correspond to regions of arbitrary size or, in other words, represent variably-sized regions of memory within some reasonable range of sizes. In the above-described embodiment, a bus bridge or system controller is enhanced to filter access requests to system memory to prevent all but those requests specifically authorized by the secure kernel from being carried out. In this embodiment, the bus bridge or system controller is a trusted component of the secure computer system, fully controlled by the secure kernel. The same technique can be applied to other types of devices that provide direct access to other types of system resources. In the above-described embodiment, the DMA engine is shown incorporated within an I/O controller, but, in alternate embodiments, the DMA engine may be separate from, and controlled by, the I/O controller or by another device. In the above-described embodiment, the secure kernel may provide unique master IDs to each non-trusted processing entity so that, at a given instant, only a single non-trusted processing entity may access a particular region of memory through a DMA engine. However, in alternate embodiments, the secure kernel may allow concurrent direct access to a particular region of memory by multiple non-trusted processing entities either by distributing multi-cast-like master IDs or by allowing multiple access-rights entries corresponding to a particular region of memory to reside concurrently within the access-rights table. In the latter case, a more complex access-rights-table organization may need to be used, to allow for multiple entries corresponding to a single memory page.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method, within a computer system containing one or more CPUs, for securing direct access, by a non-trusted processing entity external to the one or more CPUs, to a resource through a system bus, the method comprising:
   providing a bridge device external to the one or more CPUs that includes access-authorization logic and that interconnects the non-trusted processing entity external to the one or more CPUs with the system bus and, through the system bus, to the resource;
   upon receiving, by the bridge device, a resource-access request from the non-trusted processing entity external to the one or more CPUs specifying a portion of the resource, using the access-authorization logic to determine whether or not the access request is authorized;

when bridge device determines that the non-trusted processing entity external to the one or more CPUs is authorized to access the portion of the resource, providing access to the portion of the resource to the non-trusted processing entity external to the one or more CPUs; and when the bridge device determines that the non-trusted processing entity external to the one or more CPUs is not authorized to access the portion of the resource, returning to the non-trusted processing entity external to the one or more CPUs an access error.

2. The method of claim 1 wherein the bridge device further includes:
an access-rights table having access-rights-table entries.

3. The method of claim 2 wherein each access-rights-table entry includes:
an identifier identifying one or more non-trusted processing entities; and
an indication of an access type.

4. The method of claim 3 wherein access types include read access and write access.

5. The method of claim 3 wherein each access-rights-table entry further includes a specification of a portion of the resource.

6. The method of claim 2 wherein each access-rights-table entry corresponds to a portion of the resource, and wherein the access-rights-table entry corresponding to a particular portion of a resource is found by using a specification of the particular portion of a resource to generate an index into the access-rights table.

7. The method of claim 2 wherein the resource is system memory, wherein the access-rights table represents various authorizations for access to system memory, and wherein an access-rights-table entry corresponds to a portion of system memory.

8. The method of claim 7 wherein each access-rights-table entry corresponds to one of:
a physical-memory page;
a fixed-size set of contiguous words; and
a virtual-memory page.

9. A computer system that includes:
a non-trusted processing entity external to the one or more CPUs;
a resource connected to a system bus;
a bridge device external to the one or more CPUs that includes access-authorization logic and that interconnects the non-trusted processing entity external to the one or more CPUs with the system bus and, through the system bus, to the resource, the bridge device, upon receiving a resource-access request from the non-trusted processing entity external to the one or more CPUs that specifies a portion of the resource, using the access-authorization logic to determine whether or not the access request is authorized; and
a kernel that authorizes access by the non-trusted processing entity external to the one or more CPUs to portions of the resource.

10. The computer system of claim 9 wherein, when the bridge device determines that the non-trusted processing entity external to the one or more CPUs is authorized to access a portion of the resource specified in an access request, the bridge device provides access to the portion of the resource to the non-trusted processing entity external to the one or more CPUs, and wherein, when the bridge device determines that the non-trusted processing entity external to the one or more CPUs is not authorized to access the portion of the resource, the bridge device returns an access error to the non-trusted processing entity external to the one or more CPUs.

11. The computer system of claim 9 wherein the bridge device includes an access-rights table having access-rights-table entries.

12. The computer system of claim 11 wherein the kernel inserts one or more access-rights-table entries that together specify authorization for the non-trusted processing entity external to the one or more CPUs to access a particular portion of the resource into the access-rights table.

13. The computer system of claim 12 wherein each access-rights-table entry includes:
an identifier identifying one or more non-trusted processing entities; and
an indication of an access type.

14. The computer system of claim 13 wherein access types include read access and write access.

15. The computer system of claim 13 wherein each access-rights-table entry further includes a specification of a portion of the resource.

16. The computer system of claim 12 wherein each access-rights-table entry corresponds to a portion of the resource, and wherein the bridge-device access-authorization logic finds an access-rights-table entry corresponding to a particular portion of a resource by using a specification of the particular portion of a resource to generate an index into the access-rights table.

17. The computer system of claim 11 wherein the resource is system memory, wherein the access-rights table represents various authorizations for access to system memory, and wherein an access-rights-table entry corresponds to a portion of system memory.

* * * * *